United States Patent [19]
Guillemain

[11] 3,802,110
[45] Apr. 9, 1974

[54] FISHING LINE CUTTING DEVICE

[76] Inventor: Jean-Claude Guillemain, 5 Rue Henri Rabourdin 5, 78 140, Velizy, France

[22] Filed: Oct. 20, 1972

[21] Appl. No.: 299,395

[30] Foreign Application Priority Data
Oct. 26, 1971 France .......................... 71.38351

[52] U.S. Cl. ........................ 43/17.2, 43/43.12
[51] Int. Cl. ................................ A01k 97/00
[58] Field of Search ............ 43/17.2, 43.12, 44.97; 114/21 R, 21 W; 166/54.5, 54.6

[56] References Cited
UNITED STATES PATENTS

| | | | |
|---|---|---|---|
| 2,968,112 | 1/1961 | McClure | 43/17.2 |
| 2,308,238 | 1/1943 | Baker | 43/43.12 |
| 2,979,847 | 4/1961 | McKinney | 43/17.2 |
| 3,393,467 | 7/1968 | Potter et al. | 43/43.12 |
| 2,754,614 | 7/1956 | Yakel | 43/43.12 |

FOREIGN PATENTS OR APPLICATIONS
313,275  6/1929  Great Britain ...................... 43/17.2

Primary Examiner—James H. Czerwonky
Attorney, Agent, or Firm—Lane, Aitken, Dunner & Ziems, Warren B. Kice, Esq.

[57] ABSTRACT

A fishing line cutting device in which a body member, adapted to sink in water, is provided with guide members for supporting a fishing line in a manner to permit movement of the support body along the line to the portion of the line in the vicinity of a hook, or the like, which is jammed or otherwise caught in a body of water. The line is supported by the body member in a manner that a pulling force exerted by the fisherman on the line, forces the line across a cutting blade mounted on the body member, to cut the line.

17 Claims, 25 Drawing Figures

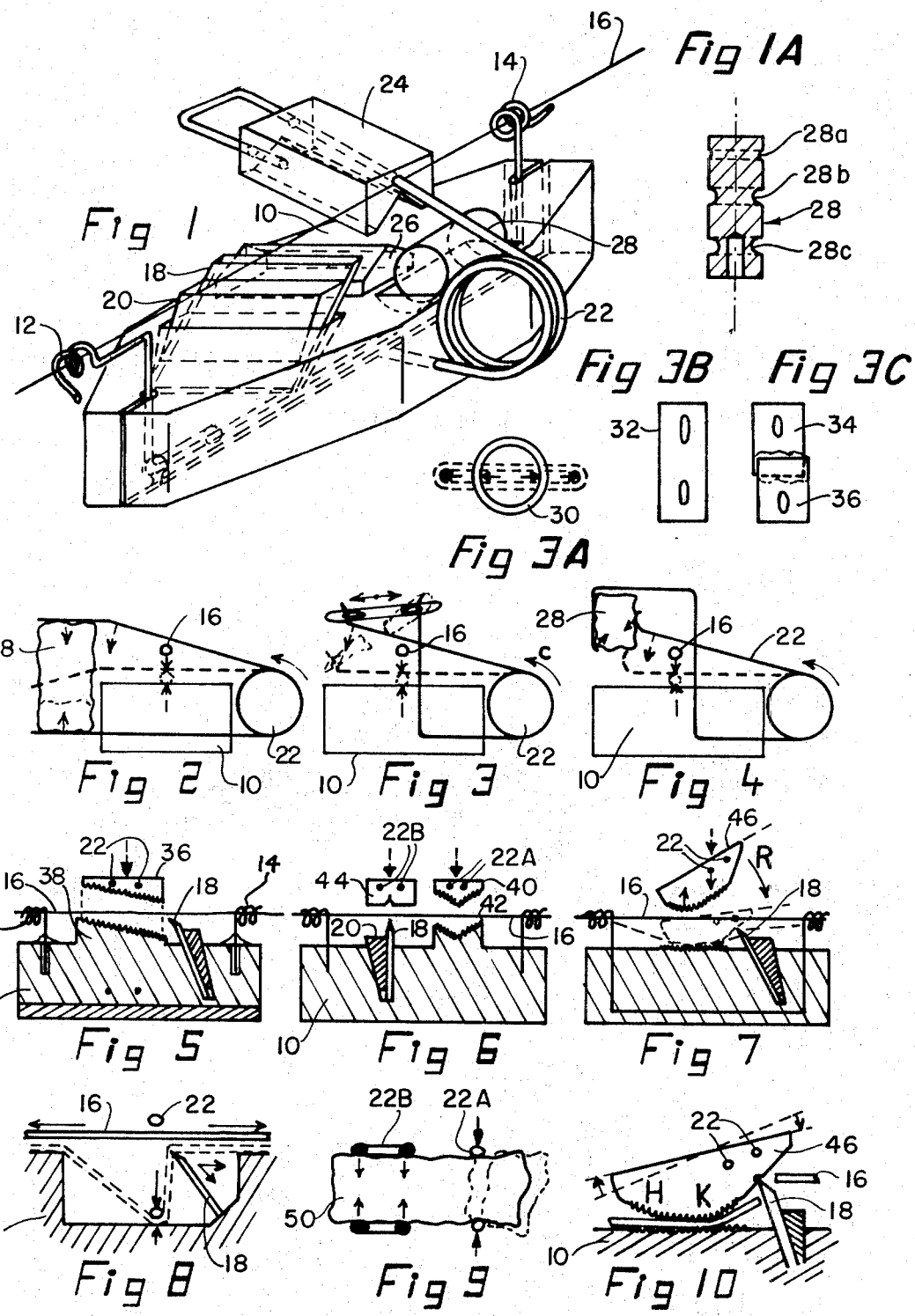

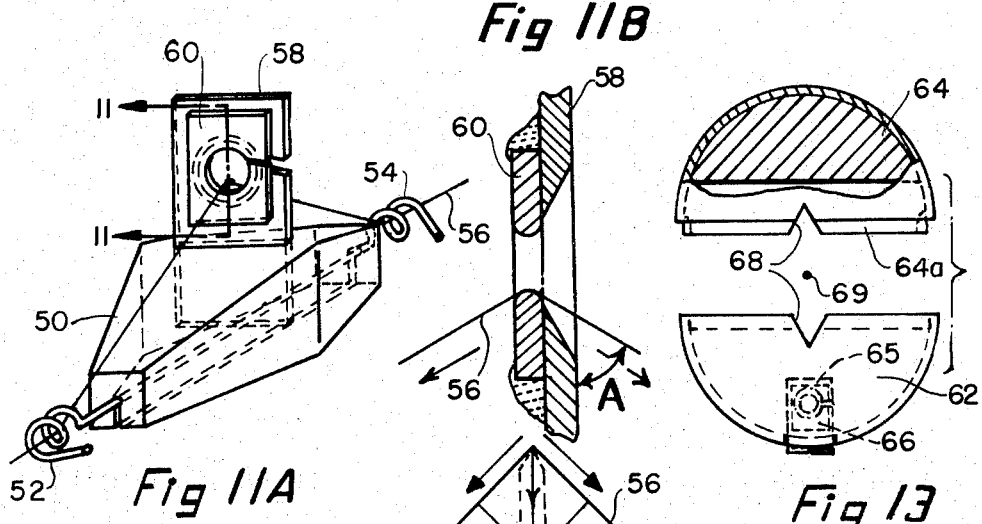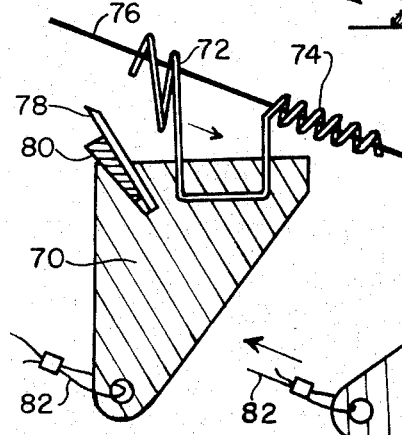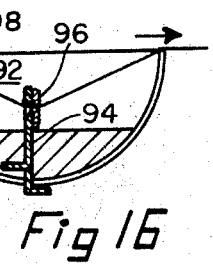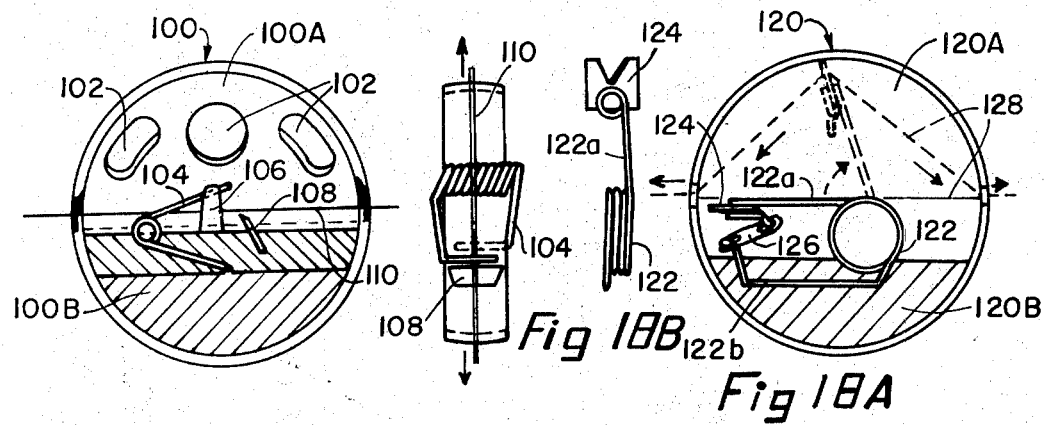

FISHING LINE CUTTING DEVICE

BACKGROUND OF THE INVENTION

This invention relates to a device for cutting a fishing line when its terminal end portion is caught or jammed in a place that is inaccessible to the fisherman, such as in deep water at a considerable distance from the shore, boat, etc. The device lends itself more specifically to lines without floats, and permits most of the line to be recovered.

A fisherman very often gets the terminal portion of his line caught under water in such rough spots as bushes, shrubs, roots, etc. Usually, the only thing he can do then is to abandon the line completely or partly, to cut it as best he can, or to try to disengage it by pulling on it. Of course, the cutting of the line wastes a good portion of the line and the pulling of the line is dangerous since it often breaks abruptly.

SUMMARY OF THE INVENTION

It is, therefore, an object of the present invention to provide a simple, inexpensive and reliable device for cutting a fishing line near the jammed fishing hook, or the like, at a distant point from the fisherman.

Towards the fulfillment of this and other objects the device of the present invention comprises a body member of a material having a density greater than one, at least one guide member adapted for attachment to said line at a point intermediate the ends of said line, said guide member being adapted to allow said body member to slide relative to said line under the action of gravity, a cutting member fixed relative to said body member, and means for establishing at least two contact zones for said line relative to said body member which are misaligned with said blade in a manner so that upon application of a pulling force on said line, the latter is cut by said blade.

BRIEF DESCRIPTION OF THE DRAWINGS

FIG. 1 is a perspective view depicting one embodiment of the device of the present invention;

FIG. 1A is a cross-sectional view of a delay body utilized in the embodiment of FIG. 1;

FIGS. 2 and 3 are schematic views depicting alternative embodiments of the device of the present invention;

FIGS. 3A-3C are elevational views depicting variations of the delay body that may be utilized in the embodiment of FIG. 3;

FIG. 4 is a schematic view depicting an alternative embodiment of the device of the present invention;

FIGS. 5-8 are partial sectional, partial elevational, partial schematic views depicting alternative embodiments of the present invention;

FIG. 9 is a schematic view depicting an alternative embodiment of the present invention;

FIG. 10 is an enlarged view depicting a portion of the embodiment of FIG. 7;

FIG. 11A is a perspective view depicting an alternate embodiment of the present invention;

FIG. 11B is a vertical cross-sectional view taken along the line 11—11 of FIG. 11A;

FIG. 12 is a schematic representation of the forces applied to the fishing line by the device of the embodiment of FIGS. 11A and 11B;

FIG. 13 is an exploded, front elevational view depicting an alternate embodiment of the present invention;

FIG. 14 is a sectional view depicting an alternate embodiment of the present invention;

FIG. 15 is a view similar to FIG. 14 but depicting the embodiment of FIG. 14 in its final, cutting position;

FIGS. 16, 17A, and 18A are sectional views depicting alternate embodiments of the present invention; and FIGS. 17B and 18B are partial views depicting components of the embodiments of FIGS. 17A and 18A, respectively.

DESCRIPTION OF THE PREFERRED EMBODIMENTS

FIG. 1 shows a fishing line cutting device of the recoverable type which is semiautomatic for cutting purposes. It comprises a base 10 of material having a density greater than one, supporting guide members 12 and 14 for guidance and suspension of the line 16, an interchangeable thin cutting blade 18 and its attachment wedge 20, and a spring 22 which positions the line for cutting and which also secures the device for recovery by means of gripping jaws 24 and 26 whose gripping surfaces have a relatively large coefficient of friction.

A delay body 28, or a body of a soluble material whose consistency changes progressively due to the action of the water, is also supported on the base 10 immediately underneath the spring 22 in a manner to restrain the jaws 24 and 26 apart against the normal bias of the spring. This assures a delayed gripping and cutting in order to permit the device to reach the lowest point of the line prior to the triggering of the spring. The delay body 28 is, in this embodiment, of a material, such as sugar, which melts and therefore releases the spring 22 from the position shown, so that the upper leg of the spring as viewed in FIG. 1, and therefore the jaw 24, snaps downwardly, towards the jaw 26 by the force of the spring.

FIG. 2 in cross-section shows the possibility of adjusting the duration of the delay by varying the effective diameter of the delay body 28 supporting the upper leg of the spring 22, and therefore the dissolution surface. In particular, the leg may be placed in one of the grooves 28A, 28B, and 28C of varying diameter, in accordance with the particular duration of delay desired.

In operation, the upper leg of the spring 22 is locked in the position shown in FIG. 1 by means of the body 28 with the leg extending in one of the grooves 28A, 28B, 28C, depending on the desired duration of the delay. The fishing line 16 is then passed through and into the guide members 12 and 14, with the base 10 being oriented so that the jaws 24 and 26 will be positioned between the cutting blade 18 and the fishing rod to insure that the device can be recovered after the line 16 is cut. It is noted that it is not necessary to have a free end of the line 16 to mount the device since the guide members 12 and 14 permit the line to be inserted therein without the need of the end of the line.

After the device has been dropped into the water, it moves along the line 16 until it reaches the lowest point in the vicinity of the jammed hook. After prolonged contact with the water, the delay body 28 releases the upper leg of the spring 22 and permits the force of the spring to urge the jaw 24 towards the jaw 26 with the line 16 being gripped therebetween. This gripping action causes the line 16 to move downwardly across the blade 18. As will be described in greater detail later, the guide members 12 and 14 support the line 16 relative to the blade 18 in a manner so that a pulling force on the line by the fisherman forces the line over the cutting edge of the blade. As a result, a free and sure cutting of the line is assured. Since the jaws 24 and 26 engage the line 16 between the blade 18 and the fishing rod, the device can be recovered after the line is cut and equipped with another delay body, for future use.

FIGS. 2–4 represent variations in the delay principle and gripping operation utilizing the same basic components as in the embodiment of FIG. 1 while permitting the line 16 to be introduced freely between the arms of the spring 22 and therefore the gripping jaws (not shown) without the need for threading the end of the line between the arms. In the arrangement of FIG. 2, the body 28 is a lump of household sugar and the spring 22 is of a conventional form of the type that is utilized in clothes pins, or the like. To install the device on the line 16, it is necessary to pass the line between the upper leg of the spring 22 and the body 28 in order to get it into the loop.

FIGS. 3, 3A, 3B, and 3C depict a device which permits the line 16 to be introduced between the arms of the spring 22 without disturbing the delay body. The delay body may consist of one of the following:

1. A body or combination of bodies that changes shape under the action of the water, without breaking up such as the porous, starchy body shown by the reference numeral 30 in FIG. 3A.
2. A body whose consistency diminishes due to the action of the water, and which then breaks up when it is subjected to the tension of the spring 22, such as the non-waterproofed cellophane, shown by the reference numeral 32 in FIG. 3B.
3. A body assembly whose connection, in a given zone, is sensitive to the action of the water such as the water insoluble pieces 34 and 36 assembled by a soluble body, such as glue, as shown in FIG. 3C. In this respect, any solid body, which undergoes a modification in consistency due to prolonged contact with the water can be used. Such a configuration permits a very cheap and very small delay body such as a piece of paper to be used, which permits a choice of several delay durations, ranging from several seconds to several minutes.

In the embodiment of FIG. 4 a body 28, such as a lump of sugar, is placed in compression, as in the previous embodiment. Also, the unique shape of the spring 22 permits the line 16 to be introduced freely between the jaws (not shown) without disturbing the delay body 28 or the spring 22.

FIG. 5 is similar to the embodiment of FIG. 1 but features a pair of jaws 36 and 38 of a different form. The arrangement of FIG. 5 offers the advantage of being usable, regardless of the nature of the line to be cut (single-strand or multi-strand, fine, thick, metallic, etc.) with equal chance of success. The relative position of the components are such that movement of the spring (not shown) clamps the thread between the jaws 36 and 38 but does not bring about any cutting action. Rather the line 16 is positioned relative to the blade 18 by the guide members 12 and 14 in such a manner that a pulling force on the line imposed by the fisherman assures cutoff. The spring 22 might even have to resist only a minimum reopening effort, following this pulling force, provided a simple locking device such as a ratchet or hook (not shown) keeps it in an almost closed position after its operation. This makes it possible to cut very strong lines by using a suitable blade and a spring with a rather weak torque, the traction force being supported primarily by the blade and the hook.

FIG. 6 shows an automatic cutting device in which the line 16 is initially locked between the jaws 40 and 42 under the action of spring 22A, and is then cut by a cutting hammer 44 cooperating with the blade 18 under the action of the spring 22B. Although not shown, it is understood that two separate delay bodies are provided, which are identical to, and operate in the same manner as, the one of the embodiment of FIG. 1. Also, the operation of the two springs of the embodiment of FIG. 6 can be controlled by a single delay body, as will be discussed in detail later.

The chief advantage of the embodiment of FIG. 6 is that it permits cutting without excessive pulling on the line which guarantees the calm return of the device, hence a reduction in the risk of sliding which would lead to loss. However, rupture is less sure than in the embodiment described in FIG. 5, particularly for the multi-strand lines with fine threads. However, gripping jaws similar to those in the embodiment of FIG. 5 can provide for the relative positioning of the line and the blade which insures a calm release and a possibility of cutting through progressive, semiautomatic traction. It is understood that the cutting system represented here by way of explanation uses the gripping of the line between the blade and the hammer but any kind of principle could be used, particularly cutoff by forced longitudinal rubbing on the blade, brought about by a moving blade which rubs on the line or by moving the line along a blade inclined relative to the body.

In the embodiment of FIG. 7, a single spring is utilized which likewise permits semiautomatic operation for emergency purposes. The device employs the natural bias of the spring as well as its lateral elasticity to torsion. In particular, upon breaking up or melting of the delay body (not shown), the line 16 is held by the left portion of an enlarged jaw 46 which then rolls to the right as viewed in FIG. 7, and cuts the line by means of clamping against the blade 18. Release is very gentle here. In case of failure, the positioning of the line 16 relative to the blade will guarantee cutoff due to the pulling forces exerted by the fisherman.

It should be noted that many versions using a separate spring for hooking up and cutting the thread could be utilized within the scope of the present invention, particularly those using very great differences in adherence coefficients between the two clamping jaws. This configuration would guarantee the retention of the line by one of the jaws while the other one, which is mobile and has a reduced friction coefficient, furnishes the counterforce necessary for the adherence of the line, as well as the handling of the cutting device. As for the two preceding embodiments, a very strong attachment between the upper jaw and the thread is necessary, in order to avoid the loss of the device. As the result of elastic tension from the fisherman, by means of a great length of thread, the line 16 imposes a durable and large traction force upon the device until the return of the line to the state of elastic rest. Insufficient gripping by the jaws 24 and 26 which would cause the thread to slide, will thus guarantee correct recovery for short lengths of line and a loss of the device for longer lines, since the grip no longer guarantees sufficient grasping action before the elastic return of the thread to the resting position.

FIG. 8 shows the common cutting principle used in all the embodiments of the invention, in which the blade and the thread are positioned in a manner so that a part of the pulling force from the fisherman is utilized in order to perform the cutting action.

The embodiment of FIG. 8 enjoys the added advantage of permitting a semiautomatic release of the line 16 through the relative positioning of the blade 18 and the line. This figure shows a variable positioning arrangement for the line 16 with respect to the blade 18 for the purpose of easy identification with the mounting proposed in FIGS. 1 and 5. The same basic principle of course could also be used with a variable position of the blade 18 with respect to the support and the line, this however being less favorable to the simultaneous tieup of the device. The spring 22 does not guarantee cutoff but effectively positions the line 16 and possibly locks it in this position; it transmits the resultant force of traction through the line to the cutting edge of the blade 18. If the blade 18 is positioned along the bisecting line of the angle formed by the two directions of the line 16 after being placed in cutting position, it is possible to cut the line by submitting it, through the cutting edge of the blade to a reaction force equal to $F = 2 F_o \cos A$ upon the line:

When $F_o$ = force exerted by the fisherman,
When $A$ = half acute angle formed by the directions of the line 16 at the edge of the blade 18.

Moreover, possible locking — by means of hood or ratchet (not shown) — of the device in the "cutting position" not shown on the drawing, would provide great diversity of utilization of one and the same device since the available cutting forces could vary within great proportions in response to the progressive stress put on by the user. Precautions must nevertheless be taken to prevent a decrease in adherence for violent traction, even in the case of locking by means of hook, since the hookup system must always perform its function in part. An independent hookup system, of course, could be associated with the cutting device according to the embodiment of FIG. 6.

The embodiment of FIG. 9 is similar to that of FIG. 6 but utilizes a single delay body 50, again preferably in the form of a lump of sugar, in order to get the adequate release of the two springs shown by the reference numerals 22A and 22B, with their associated jaws being omitted for the convenience of presentation. The upper leg of spring 22A is released before the upper leg of spring 22B following a different distribution of stresses exercised by them upon the delay body. In particular, it is possible to increase the stress of spring 22A with respect to that of spring 22B by increasing the spring torque, reducing the surface in contact with the delay body, which brings about an increase in the pressure for producing the rapid breakup of the delay body associated with spring 22A and the slow crushing of the delay body associated with spring 22B.

FIG. 10 shows the combined automatic and semiautomatic cutting device used in FIG. 7. In operation, after rupture of the delay body (not shown), the thread 16 is pinched and hooked between the jaw 46 and the upper surface of the body 10. The reaction of the body 10 on the jaw 46 via the line 16 creates a torque, as a result of the decentering of the thrust of the spring. The clamping action remains effective but its active zone rolls from position H toward position K.

The line 16 is cut by compression between the jaw 46 and the blade 18. In case of failure caused by metallic, or multi-strand thread, the progressive pulling force from the fisherman guarantees cutoff by using the principle employed in FIG. 8.

FIGS. 11A and 11B show an example of a relatively inexpensive cutting device which allows only one release. The device comprises a base 50 supporting guide members 52 and 54 for guidance and suspension of the line 56. The base 50 may be made of heavy material, such as lead, which guarantees the maintenance, in position, of a blade 58 whose cutting portion is disengaged from the line 56 during the casting action by a guide body 60 of a soluble material which, in its solid state, provides a gentle friction on the line and prevents the latter from being damaged or leaving the active cutting zone.

In operation, the line is inserted in the guide members 52 and 54 and through the openings provided in the blade 58 and the guide body 60. After casting, the line 56 is gently held back, slightly relaxed, and the device is allowed to slide towards the bottom of the body of water. After the device reaches its closest position to the hook, or the like, and the soluble body 60 melts, progressive tension is exerted by the fisherman upon the line 56 in order to effect the cutting of the line across the exposed edge of the blade 58 with the line being maintained in a proper cutting position by the two point support provided by the guide members 52 and 54. The base 50 may be recoverable by a second line or the like, although the very low cost of the device could justify its abandonment.

Specific details of the blade 58 and the cutting principle utilized in the embodiment of FIG. 11 are explained in greater detail in FIG. 12. In particular, the proper operation of the device requires the line 56 to be inclined a relatively large degree relative to the base 50 to avoid premature cutting of the line. The makeup of forces permitting the cutting of the line 56 are shown by the arrows in FIG. 12. After traction from the fisherman, the caught end of the line 56 furnishes an opposite reaction force of equal value and these forces are combined, after deviation by means of the guide members 52 and 54 and they produce a resultant that produces the cutting force. This design enables a variance in the traction force necessary for the cutting of the line 56, depending on the size and strength of the line.

It is understood that the soluble body 60 of the embodiment of FIGS. 11A and 11B can be replaced by a similarly shaped body of an elastic material, so that the application of a large traction force upon the line 56 will produce an elastic deformation or momentary displacement of the body which, in turn, permits the cutting edge of the blade 18 to be exposed to the line and cut same. Also, the design can be such that the elastic body can engage the line outside the cutting zone after cutting for the purpose of recovering the device.

As a further variation, the body 60 may be adapted to break or become unglued to permit cutting of the line in the same manner discussed above.

The device of FIG. 13 is in the form of a sphere made up of a lower hollow hemispherical portion 62 and an upper hemispherical member 64, a portion of which is hollow, and a portion of which is solid, as shown. Although the hemispherical portions 62 and 64 are shown separated in the drawing for convenience of presentation, it is understood that, in use, they will be connected by means of a friction fit between an extended portion 64a integral with the hemispherical portion 64 and a portion of the inner wall of the hemispherical portion 62. A blade 65 and a soluble body 66 are supported by the lower hemispherical portion 62, and are identical to the blade 58 and soluble body 60, respectively, of the embodiment of FIGS. 11A and 11B. A pair of guide notches 68 are formed in each of the hemispherical members 62 and 64 to guide the fishing line 69 into the holes provided in the blade 65 and the soluble body 66.

In operation, the hemispherical portions 62 and 64 are aligned so that the line 69 extends through the notches 68 and the holes in the blade 65 and the soluble body 66. The hemispherical portions 62 and 64 are then fastened and the device cast in water, with the weight of the solid portion of the hemispherical portion 64 carrying the device down through the water until the lowermost point is reached. The cutting operation is then identical to that described in connection with the embodiment of FIG. 11A and 11B.

In the embodiment of FIG. 14, a base member 70 is provided which has a pair of guide members 72 and 74 formed from the same wire anchored in the base member 70 and extending above the upper surface of the base 70. The guide member 72 has relatively large diameter openings and the guide member 74 has relatively small diameter openings, with the guide member 72 extending a greater distance from the latter upper surface than the guide member 74. A blade 78 is supported in the base member 70 by a wedge member 80. An auxiliary line 82 is tied through a hole provided in the base member for retrieving the device after cutting the line.

The guide members 72 and 74 enable an intermediate portion of the line 76 to be inserted therein and function to support and guide the base member 70 towards the jammed end portion of the line 76. After reaching the latter portion of the line 76, the base member 70 takes the cutting position shown in FIG. 15. In this portion, a force exerted on the lines 76 and 82 by the fisherman will cause the line 76 to be severed by the blade 78. The free portion of the line 76 can simply be retrieved by the fisherman in a normal manner by pulling the auxiliary line 82. During this latter action the slight clamping of the line by the guide member 74 may permit retrieval of the jammed portion of the line 76. It is noted that in the embodiment of FIG. 15 a pulling of the line 82 will also increase the cutting force applied to the line 76 by the blade 78.

In the embodiment of FIG. 16, the base member 90 is in the form of a hemisphere having a hollow portion 92. A blade 94 is supported by the base member 90 and extends in the hollow portion 92 with a soluble body member 96 being mounted adjacent the blade in a manner similar to the soluble body member 60 in FIGS. 11A and 11B. The line 98 is supported as shown on the edges of the hemisphere to establish, along with the blade 94, a three-point contact with the point of contact of the blade being out of alignment with the points of contact with the edge of the hemisphere. The operation is otherwise similar to that of the embodiment of FIGS. 11A and 11B.

In the embodiment of FIGS. 17A and 17B, a spherical body member 100 is formed by an upper hollow hemispherical portion 100A having a plurality of openings 102 therein, and a lower solid hemispherical portion 100B, attachable to the upper portion in the same manner as discussed in connection with the embodiment of FIG. 13. Supported in the hemispherical portion 100B is a spring 104 the upper arm of which is supported in an elevated position against the bias of the spring by means of a soluble body 106. A cutting blade 108 is mounted adjacent the soluble body 106 with the fishing line 100 being guided through slots in the body member 100 immediately above the blade during travel of the body toward the final resting position. In operation, the melting of the soluble body 106 will permit release of the upper arm of the spring 104 and cause same to force the line 110 over the cutting blade 108 to cut the line. The device can be recovered by virtue of the action of the upper arm of the spring 104 securing the line 110 against the upper surface of the solid portion of the hemisphere 100B.

In the embodiment of FIG. 18A and 18B, a hollow sphere 120 is provided comprising an upper hollow hemispherical portion 120A joined to a lower hemispherical portion 120B. A spring 122 is mounted relative to the hemispherical portion 120B and has an upper arm 122A and a lower arm 122B. A notched blade 124, better shown in FIG. 18B, is supported by the upper arm 122A. A soluble body 126 is supported between the arms 122A and 122B to force them into a closed position against their internal bias. In operation, the line 128 is strung between two openings provided in the body 120, and upon the device descending into the water to the lowermost point of the jammed line 128, the soluble body 126 will melt causing the upper arm 122A to spring to the position shown by the dashed lines and cause the blade 124 to cut the line.

It can be appreciated that the use of the hemispherical members and the spherical members of the above embodiments prevents possible injury to bathers or the like since the cutting blade and cutting edges are well covered.

Of course, other variations of the specific construction and arrangement of the devices disclosed above can be made by those skilled in the art without departing from the invention as defined in the appended claims.

I claim:

1. A fishing line release device comprising a body member of a material having a density greater than one, means mounted on said body member and defining a pair of spaced apart guide openings for receiving said line and allowing said body member to slide relative to said line under the action of gravity, and a cutting member mounted on said body member between said guide openings and positioned out of alignment with said guide openings so that upon application of a pulling force on said line, the latter is cut by said cutting member.

2. The device of claim 1 wherein said body member is in the form of a hemispherical shell at least a portion of which is hollow, said cutting member being disposed in said hollow portion.

3. The device of claim 1 wherein said body member is in the form of two separable hemispherical members normally connected to form a sphere at least a portion of which is hollow.

4. The device of claim 3 wherein a set of slots is provided on at least one of said shells to receive said line.

5. The device of claim 1 further comprising means mounted on said device and responsive to the presence of water for forcing a portion of said line across said cutting member.

6. The device of claim 5 wherein said forcing means is in the form of a spring biased to a position to force said line over said cutting member and further comprising a soluble body member normally restraining said spring against said bias and dissolvable in water to release said spring.

7. The device of claim 6 wherein said spring retains said line after the cutting thereof to permit said device to be retrieved.

8. The device of claim 6 wherein either the force provided by said pulling of said line or the force of said spring is sufficient to cut said line.

9. The device of claim 1 further comprising means to isolate said line from said cutting member during said sliding movement of said body member.

10. The device of claim 9 wherein said isolation means comprises a soluble body member adapted to dissolve in water.

11. The device of claim 9 wherein said isolation means comprises an elastic member which normally isolates said line from said blade but responds to said force to permit contact of said line with said cutting member.

12. The device of claim 1 wherein said body member is in the form of a hemispherical shell at least a portion of which is hollow, said cuttinng member disposed in said hollow portion.

13. The device of claim 1 wherein said body member is in the form of two separable hemispherical members normally connected to form a sphere at least a portion of which is hollow, said cutting member being disposed in said hollow portion.

14. The device of claim 13 wherein said guide openings are in the form of a set of slots provided on at least one of said shells to receive said line.

15. The device of claim 1 wherein said means defining a pair of guide openings permits insertions of a section of said line into said guide openings, said section of line being located between the ends of said line.

16. A fishing line release device comprising a body member of a material having a density greater than one, means mounted on said body member and defining a pair of spaced apart guide openings for receiving said line and allowing said body member to slide relative to said line under the action of gravity, and a cutting member mounted on said body member and positioned out of alignment with said guide openings with one of said guide openings being located intermediate said cutting member and the other guide opening, and means for applying a pulling force on said body member to move said cutting member relative to said line and cut said line.

17. The device of claim 16 wherein said means for applying a pulling force comprises a thread attached to said body member, said thread permitting a retrieval of said body member after said cutting.

* * * * *